3,793,239
FOAMED THERMOPLASTICS
John Albert Rixon, Shefford, and Anthony Graham
 Marshall Last, Welwyn Garden City, England, assignors
 to Imperial Chemical Industries Limited, London, England
No Drawing. Filed Apr. 30, 1971, Ser. No. 139,273
Claims priority, application Great Britain, May 8, 1970,
 22,381/70
Int. Cl. C08f 47/10, 29/12
U.S. Cl. 260—2.5 E
15 Claims

ABSTRACT OF THE DISCLOSURE

Producing foamed films from a blend of a polyolefine and a small amount of a higher melting polymer, especially HD polyethylene/polypropylene blends, by the PEF process involving a 2-component blowing agent system.

---

This invention relates to foamed thermoplastic materials and to a process for their manufacture.

In our Belgian patent specification 730,947 we describe a process for the production of foamed thermoplastic materials wherein the pressure is released from a pressurized homogeneous mixture of the molten thermoplastic material and a blowing agent system comprising a first blowing agent which is completely miscible with the molten thermoplastic material at the said pressure and a second blowing agent which has a solubility of at least 0.01% by weight in the thermoplastic material and a critical temperature less than the temperature of the homogeneous mixture at the point when said pressure is released.

In this process, the second blowing agent is believed to act as a nucleating agent for the first blowing agent.

We have found that when applying that process to crystalline polyolefines, an improved texture of the product, as judged by the size and uniformity of the cellular structure, may be obtained by using as the polymeric component of the thermoplastic composition a mixture of at least one crystalline polyolefine and a minor amount of a thermoplastic polymer, particularly another crystalline polyolefine, of higher melting point. This is thought to be because, for crystalline polyolefines, the second blowing agent does not exert a sufficient nucleating effect to produce a fine celled product and the presence of a minor amount of a thermoplastic polymer of higher melting point in the mixture has been found to give rise to a finer cell structure and an improvement in the uniformity of the cell size in the product. It is thought that this may be due to the higher melting component of the mixture being the first to crystallize as the thermoplastic composition is discharged from the pressure vessel and thus providing sites within the still molten major component of the mixture where bubble formation may start. In this way, the higher melting component is thought to be acting as an additional nucleating agent.

Accordingly we provide a process for the manufacture of a foamed thermoplastic material wherein a molten thermoplastic composition at an elevated pressure and temperature is discharged to a region of lower pressure, said thermoplastic composition comprising a homogeneous mixture of a polymeric component and a blowing agent system comprising a first blowing agent which at said elevated temperature and said elevated pressure is a liquid which is completely miscible with the molten polymeric component and which is gaseous at said elevated temperautre at the pressure prevailing in said region of lower pressure, and a second blowing agent, which has a solubility of at least 0.01% by weight in the mixture of the polymeric component and the first blowing agent and a critical temperature below said elevated temperature characterized in that the polymeric component of said thermoplastic composition consists of a mixture of polymers containing as a major component thereof a crystalline polyolefine and, as a minor component, a thermoplastic polymer of higher melting point than said crystalline polyolefine, said thermoplastic polymer of higher melting point constituting from 1 to 15% by weight of said mixture.

It is to be understood that when in this specification we refer to a homogeneous mixture, we mean the mixture of the molten polymeric component and the blowing agent system is homogeneous. We do not exclude the presence of other materials such as inert fillers or an excess of the second blowing agent dispersed therein as a separate gaseous phase. We prefer, however, not to use an excess of the second blowing agent.

Crystalline polyolefines that may be used in the process include the stereoregular polymers and copolymers of α-olefines such as ethylene, propylene, butene-1 and 4-methyl pentene-1 and higher α-olefines. Such crystalline polymers are well known in the art and are generally prepared using particular stereospecific organometallic catalysts. Exemplary of such polymers are high density (specific gravity at least 0.94 when measured at 23° C. by British Standard 3412 of 1966) homo- and co-polymers of ethylene; isotactic homo- and co-polymers of propylene; homo- and co-polymers of butene-1; and homo- and co-polymers of 4-methyl pentene-1.

While it is preferred that the higher melting thermoplastic polymer is a crystalline polyolefine, others that may be used include linear polyamides and linear polyesters.

It is particularly preferred that the polymeric component of the thermoplastic composition is a bicomponent mixture of two crystalline polyolefines. The major component of the mixture is preferably a high density ethylene polymer or a high density co-polymer of ethylene with minor proportions of one or more comonomers such as propylene, butene-1, or 4-methyl pentene-1, or a propylene homo- or co-polymer. The minor component of the mixture is preferably a homo- or co-polymer of propylene or a homo- or co-polymer of butene-1, or a homo- or co-polymer of 4-methyl pentene-1.

Where copolymers are employed, they generally should contain at least 80% by weight of units derived from one monomer.

Providing they are of differing melting points, two or more polymers of the same monomer or monomers may be used. Thus mixtures of an ethylene homo- or co-polymer with another ethylene copolymer may be utilized.

Particularly useful polymeric components of the thermoplastic material consist of mixtures of a high density ethylene polymer, particularly one having a specific gravity of 0.94 to 0.97, and a propylene polymer, or mixtures of a propylene polymer and a 4-methyl pentene-1 polymer.

The amount of the higher melting thermoplastic polymer that is used in the polymeric component should be within the range 1 to 15%, preferably 3 to 12%, by weight of the mixture. The use of smaller quantities gives negligible improvement over the use of a single crystalline polyolefine as the polymeric component, while larger quantities tend to give variable cell structures and may give rise to processing difficulties. Particularly useful results are obtained when the mixture contains between 5 and 10% by weight of the higher melting thermoplastic polymer.

The mixture of the crystalline polyolefine and the higher melting thermoplastic polymer may be made by blending together the polymer powders followed by melt mixing. The mixture of polymers may be mixed with the blowing agent system in a pressure vessel through which the mixture of polymers are passed in the molten state and into the melt of which the blowing agent system is injected. After incorporation of the blowing agent system, the thermoplastic composition is discharged from the pressure vessel into a region of lower pressure, whereupon it foams. The region of lower pressure will generally be at atmospheric pressure.

The pressure vessel is preferably an extruder, particularly a screw extruder, from which the thermoplastic composition is extruded through a suitable die to produce the end product of the required shape, for example, tube, tubular film, foil, sheet, filament or angled section, or, by using a cross-head die, articles coated with the foamed composition, for example wire coatings. Since it is found that the best quality foam is produced when the distance over which the pressure drop from the interior of the pressure vessel to the lower pressure region is as short as possible, we prefer to use a die having a short land length.

Where the first blowing agent is a solid or liquid at room temperature and atmospheric pressure, it is also possible to add this component of the blowing agent system to the mixture of polymers before the mixture is introduced to the pressure vessel or to one or more of the polymers from which the mixture is produced. However, this is a less preferred mode of operation, especially where the first blowing agent is a liquid at room temperature, since an excess of the first blowing agent is used which means that the thermoplastic composition is generally too fluid to be fed directly to the feed hopper of the extruder.

In addition, generally the mixture of the polymers and the first blowing agent are not miscible in the cold. Consequently such a mixture would consist of a slurry which would not feed satisfactorily to the feed hopper. Also the first blowing agent would be liable to boil off from the feed section of the extruder, back through the feed hopper, with consequent fire risk where the first blowing agent is inflammable, as the incompletely fused polymer mixture would not exert a sufficient barrier to the passage of the vaporized blowing agent backwards through the feed section. These problems are overcome by the injection of the first blowing agent directly into the barrel of the extruder beyond the feed section, i.e. into the melt of the polymer mixture. This technique allows a good control over the quanity of the blowing agent added.

The second gaseous blowing agent is injected into the molten polymer mixture as it passes through the pressure vessel. Preferably the second gaseous blowing agent is injected at a different point to the first blowing agent as injecting them together would necessitate injecting a solution of the second blowing agent in the first blowing agent, in which the second blowing agent may have only a limited solubility, or else maintaining a homogeneous mixture of the two phases in the pumping lines which is difficult to ensure. Consequently the system would be less versatile.

Where an extruder is used as the pressure vessel, it is important to provide a constriction in the extruder upstream of the point or points where the blowing agents are introduced to prevent the blowing agent surging back towards the feed end of the extruder. This may be achieved by employing a screw, or screws in the case of a multiscrew extruder, which cause a buildup of pressure prior to the constriction and a region of comparatively lower pressure after the constriction. The blowing agents are then introduced into such a lower pressure region (the pressure of which may in practice be of the order of 70 kg. cm.$^{-2}$) which is hereinafter referred to as a decompression zone.

The first and the second blowing agents are selected so that they are inert with respect to the mixture of polymers under the pressure and temperature conditions of the pressure vessel.

The first blowing agent which is completely miscible with the mixture of polymers to be foamed may be a solid, a liquid or a gas at normal temperature and pressure. However, it must have a boiling point below the temperature at which the thermoplastic composition is discharged from the pressure vessel at the pressure prevailing in the region of lower pressure into which the mixture is released so that foaming will occur at that temperature. It will be understood from the above that we do not include in the present invention the use of blowing agents which cause foaming solely because of decomposition at an elevated temperature.

At the same time the first blowing agent must be a liquid which is a good solvent for the mixture of polymers under the conditions of pressure and temperature prevailing in the pressure vessel at least immediately prior to the point from which the thermoplastic composition is discharged.

When using an extruder provided with a decompression zone, the first blowing agent is preferably a good solvent for the mixture of polymers under the conditions of pressure and temperature prevailing in this decompression zone. This means that, for example, a vapor having a critical temperature below the temperature at which the thermoplastic mixture is discharged from the pressure vessel would not be suitable as the first blowing agent of our invention. In view of this and other limitations, we have found that the most suitable substances for use as the first blowing agent are liquids whose boiling points at atmospheric pressure are greater than room temperature, i.e. 20° C. and are at least 10° C. below the temperature at which the thermoplastic composition is discharged from the pressure vessel.

Examples of liquids which may be used as the first blowing agent in our invention include saturated hydrocarbons such as pentane, hexane, heptane, octane; unsaturated hydrocarbons such as pentene, 4-methyl pentane, hexene; petroleum ether fractions; and halogenated hydrocarbons such as carbon tetrachloride, chloroform, ethylene dichloride, methylene chloride, or 1,1,3-trichloro-1,2,2-trifluoroethane.

A very suitable first blowing agent is pentane. Other liquids which are particularly useful as the first blowing agent are 1,1,3 - trichloro-1,2,2-trifluoroethane, hexane, petroleum ether (B.P. 40° C. to 60° C. or 60° C. to 80° C.) and methylene chloride.

A concentration of the first blowing agent of at least 10% by weight, based on the weight of the mixture of polymers is normally required. The amount used is in excess of the amount required to cause the thermoplastic composition to foam and the excess of the blowing agent vaporizes on discharge of the composition into the region of lower pressure thus absorbing latent heat from the polymeric component of the composition as it emerges from the region of high pressure and foams. In this way the foamed composition is set in its foamed state.

If smaller quantities of the first blowing agent are used, all the blowing agent will vaporize before the composition has solidified. This will permit the foam structure to disappear or be modified since there will be insufficient cooling of the foamed composition by the vaporizing blowing agent to cause it to solidify while there is still sufficient gas pressure generated by the blowing agent system to maintain the foam structure.

We have found that the best results are obtained using 20% to 45% by weight of the first blowing agent, based on the weight of the mixture of polymers.

If a concentration of first blowing agent of more than 50% by weight, based on the weight of the mixture of polymers, is used, then the product is expensive to produce and there is a tendency for the cell walls in the foamed product to shatter so that an unsatisfactory product is obtained.

The second blowing agent is thought to act as a nucleating agent for the cells formed by the first blowing agent.

It may be a gas or a low boiling liquid at room temperature although we prefer to use a gas. The second blowing agent should have a critical temperature less than the temperature of the thermoplastic composition on it discharge from the pressure vessel.

It is essential that the second blowing agent should have at least some solubility (0.01% by weight) in the mixture of polymers and the first blowing agent under the conditions of pressure and temperature prevailing within the pressure vessel since otherwise there will not be sufficient of the second blowing agent in the thermoplastic composition to nucleate a large number of very small bubbles in the composition on its discharge from the pressure vessel and nucleation may instead arise from the first blowing agent with the result that a small number of very large bubbles are produced and the product is of little commercial use. Examples of second blowing agents that may be used include one or more of the following gases: carbon dioxide, nitrogen, air (for polymers and first blowing agents not subject to oxidation), methane, ethane, propane, ethylene, propylene, hydrogen, helium, argon and halogenated derivatives of methane and ethane e.g. tetrafluorochloroethane. Carbon dioxide or nitrogen are particularly suitable, preferably in a concentration of at least 0.05% by weight of the thermoplastic composition.

We prefer to add as much of the second gaseous blowing agent as possible but not more than will exceed its solubility which is usually fairly low, i.e. less than 10% by weight of the thermoplastic composition.

The solubility of the second, gaseous, blowing agent depends of course on the nature of the second blowing agent, the nature and proportions of the polymers, the temperature and pressure in the pressure vessel, and to some extent on the amount and nature of the first blowing agent.

In considering the solubilities of inert gases, e.g. nitrogen, in polyolefines and hydrocarbon first blowing agents, the following considerations apply. For non-hydrocarbon first blowing agents and polymer mixtures where the higher melting polymer is not a polyolefine, they also act as a guide.

Above the melting point of the mixture of polyolefines, the first blowing agent and the polyolefines will be infinitely miscible. A given weight of first blowing agent/polyolefine mixture will have somewhat greater solubility for the second blowing agent than that of the same weight of the polyolefine mixture alone, because the entropy of mixing will be increased by the presence of the low molecular weight material. (Other minor changes will occur due to the changed ratio of $CH_3$ to $-CH_2-$ groups.)

In the range of interest, solubility increases with pressure, but slightly less than proportionately, and that contrary to what has been found for solvent/polymer mixtures, solubility increases with temperature. This is contrary to the usual experience of permanent gases dissolving in condensed phases.

Generally pressure limitations dictate how much of the second gaseous blowing agent may be incorporated and normally the amount of second blowing agent will be within the range 0.1 to 1.5%, preferably 0.2 to 1.0%, by weight of the polymer mixture.

It will be understood, as mentioned above, that some excess of the second blowing agent above its solubility may be added (although this is not preferred), this excess being present in finely divided gaseous form and that this excess is not inconsistent with the requirement of homogeneity which refers to the dissolved material.

Since the foam nucleating agent in our process is a soluble gas and not, as in some systems previously used, a solid particle, the foam may be produced free from non-thermoplastic contaminants and thus is very suitable for electrical applications where a high dielectric strength and low power factor are required. The system of the present invention is also cheap when readily available blowing agents are used.

Preferably, both blowing agents are introduced into the pressure vessel at a similar position. In the case where an extruder is used this position may conveniently be the decompression zone referred to above.

Either blowing agent may be injected into the pressure vessel by means of a metering device. In the preferred case where an extruder is used and where the first blowing agent is a liquid and the second a gas, the liquid may be injected into the decompression zone by a piston, diaphragm or other metering pump which leads to an oscillation of pressure within the decompression zone. By supplying the second gaseous blowing agent to the decompression zone through a non-return valve at a pressure within the range of pressure oscillations produced by the liquid metering pump, the supply of that blowing agent is also automatically controlled by the liquid metering pump. A typical system is as follows:

The mixture of polymers are fed in powder form to a hopper of a screw extruder wherein it is melted in a feed section and extruded through a die. The first blowing agent is fed from a supply to a metering pump from whence it is injected into the polymer melt in the extruder barrel via an injection port fitted with a non-return valve. The second blowing agent is fed from a constant pressure supply to a pressure regulating valve from whence it passes into the polymer melt via an injection port fitted with a non-return valve. The blowing agents are thoroughly mixed with the polymer melt in a mixing section of the extruder screw between the injection ports and the die.

The process of the invention may be used to extrude a tubular foamed film of the mixture of polymers which is then inflated as it is hauled from an annular extrusion die.

If desired, the thermoplastic composition may include any suitable additives such as stabilizers, pigments, fillers and dyes, and processing aids such as lubricants and plasticizers, which are not affected by the blowing agents employed. For some uses it may be required that the end product should be opaque and also desirably have a matt appearance. Therefore, an opacifying pigment, such as silica, titanium dioxide or talc, may be included in the thermoplastic composition. Another opacifying pigment that may be used is that described in our Belgian Pat. 750,760, namely a pigment comprising, by weight of the mixture of polymers from 5 to 20% of titanium dioxide and from 0.05 to 1.0% of metallic aluminium particles, the latter having a number average particle size of at least 20 $\mu$m. and including not more than 20% by weight of particles having a size less than 10 $\mu$m.

We have found that film, foil and sheet products produced according to this invention may be employed for many of the uses for which conventional cellulosic paper and card are suitable. For such uses it may be desirable to subject one or both surfaces of the film, foil or sheet to a surface treatment which will improve the bonding properties of the surface, thereby improving the adhesion of printing inks and other materials to the surface. The surface treatment may be a chemical or physical treatment or the surface may be coated with a suitable material. One suitable chemical treatment comprises oxidation of the surface with a mixture of chromic acid and sulphuric acid. A suitable physical treatment comprises that commonly known as corona discharge treatment. If a coating is employed it is convenient to use a polar polymer such as chlorinated polyethylene which may be applied from a solution.

When corona discharge treatment is employed, the treatment may be effected by exposing the surface to an electric discharge from one or more electrodes maintained at a high potential. The method is illustrated in FIG. 5 of p. 139, Plastics and Polymers, April 1969.

The film, foil or sheet produced according to this invention, may be employed for many uses for which conventional paper and card is suitable, particularly those requiring printability if the surface of the film, foil or sheet is firstly subjected to the surface treatment described above. Printing may be effected by any conventional process such as letterpress, litho and gravure printing. Examples of such uses include materials for wrapping and packaging articles, newsprint, magazines and journals, books, posters, wallpaper or backing for wallpaper. The products of the invention may also be used to produce articles which may be decorated by printing, such as curtains and furniture upholstery, and clothing. Examples of other uses include surgical dressings, overalls, underwear, car seats, roof sarking, sacks and sacking, bed linen, blankets and pillow cases and electrical uses requiring a material having a high dielectric strength and a low power factor, sound insulants, and decorative tapes, ribbons and filaments.

The invention is further illustrated by the following examples in which all parts and percentages are by weight.

EXAMPLE 1

A blend containing 95 parts of polyethylene having a specific gravity of 0.96 together with 5 parts of polypropylene was fed to a 3.2 cm. extruder fitted with a screw rotating at 40 r.p.m. consisting of a normal polyethylene type first section followed by a constriction, a decompression zone wherein the root diameter of the screw is reduced, in turn followed by a compression and metering zone feeding the die. 22% pentane and 0.7% nitrogen (based on the blend of polyethylene and polypropylene) were injected into the decompression zone using the injection system described hereinbefore consisting of metering pump, constant pressure supply and non-return valves. After homogenization the mixture was extruded through an annular die maintained at 140° C. This die was of the cross-head type, having a lip diameter of 3.2 cm. and semi-radial lips giving a 0.64 mm. die lip gap. The tube was extruded through the die into the atmosphere with a pressure drop across the die of 17 kg. cm.$^{-2}$ and passed vertically upwards and inflated by air to form a bubble of diameter 30 cm. which was later collapsed by means of nip-rollers. The product was a paper-like cellular film exhibiting a crisp feel and having a fine even cell structure, little surface gloss, and the characteristics shown in the table.

EXAMPLE 2

A blend containing 90 parts of the polyethylene and 10 parts of the polypropylene was extruded in the same manner as described in Example 1. A paper-like cellular film similar to that of Example 1 and having the characteristics shown in the table was produced.

EXAMPLE 3

By way of comparison, Example 1 was repeated but using 100 parts of the polyethylene and no polypropylene. This time the product was a film of much coarser, more variable cell structure having a somewhat fibrous appearance, a glossy surface and having the characteristics shown in the table.

EXAMPLE 4

Example 1 was repeated using 99 parts of the polyethylene and 1 part of the polypropylene. The product was coarser and had a more variable cell structure than that of Example 1 and had a more fibrous appearance but was not as coarse and variable nor as fibrous as that of Example 3.

EXAMPLE 5

Example 1 was repeated using a mixture of 85 parts of the polyethylene and 15 parts of the polypropylene. The resulting film had a wider cell size distribution than the product of Example 1, and a somewhat fibrous appearance. The product was similar to that of Example 4.

EXAMPLE 6

By way of comparison Example 1 was repeated using a mixture of 80 parts of the polyethylene and 20 parts of the polypropylene. The product was similar to that of Example 3. Similar results were obtained when using equal amounts of the polyethylene and the polypropylene. In both cases, the extrudate at the die was rough and had insufficient melt strength to enable a satisfactory inflated bubble to be formed.

EXAMPLE 7

Example 1 was repeated using a blend of 90 parts of the polyethylene, 8 parts of the polypropylene and 2 parts of titanium dioxide as a filler. The paper-like film produced had an improved opacity, a matt surface and had the characteristics shown in the table.

EXAMPLE 8

Example 1 was repeated using a blend of 93 parts of the polyethylene, 5 parts of the polypropylene, and 2 parts of talc. A product similar to that of Example 7 was obtained.

EXAMPLE 9

Example 1 was repeated using a blend of 85 parts of the polyethylene, 5 parts of the polypropylene, and 10 parts of a silica filler having an irregular particle shape. A product similar to that of Examples 7 and 8 was produced but could be written upon more clearly with a lead pencil than the films of Examples 7 and 8.

EXAMPLE 10

Example 1 was repeated using a blend of 80 parts of the polyethylene, 7.8 parts of the polypropylene, 2.2 parts of titanium dioxide and 10 parts of the silica filler used in Example 9. A paper-like film similar to that of Example 9 was obtained having the characteristics shown in the table.

In the table the percentage by volume occupied by closed cells, open cells and cell walls was measured by the method of W. J. Remington and R. Pariser, Rubber World, May 1958, pp. 261 and 264. The tensile strength, elongation at break and Elmendorf tear strength was measured in the machine direction (M.D.) and the direction transverse thereto (T.D.).

| Example number | 1 | 2 | 3 | 7 | 10 |
|---|---|---|---|---|---|
| Film thickness, μm | 100 | 100 | 210 | 130 | 110 |
| Film substance (weight per area), g. m.$^{-2}$ | 49 | 46 | 58 | | 50 |
| Film density, kg. m.$^{-3}$ | 477 | 447 | 284 | 420 | 440 |
| Percentage by volume: | | | | | |
| Closed cells | 1 | 0 | 2 | 19 | 0 |
| Open cells | 49 | 53 | 68 | 37 | 57 |
| Cell walls | 50 | 47 | 30 | 44 | 43 |
| Tensile strength, MN m.$^{-2}$: | | | | | |
| MD | 9.4 | 7.7 | 4.2 | 5.6 | 6.1 |
| TD | 8.0 | 8.0 | 5.7 | 10.3 | 6.9 |
| Elongation at break, percent: | | | | | |
| MD | 6 | 4 | 8 | 5.5 | 6 |
| TD | 8 | 6 | 8 | 10.0 | 14 |
| Elmendorf tear strength, k. Jm.$^{-2}$: | | | | | |
| MD | 3.6 | 4.3 | 2.5 | 9.65 | 2.7 |
| TD | 3.7 | 3.2 | 2.4 | 5.75 | 2.3 |
| Opacity, percent | 62 | 60 | 73 | 78 | 78 |
| Ink absorption | (¹) | (¹) | (²) | (³) | (²) |
| Cell diameter, μm.: | | | | | |
| Range | 100–600 | 100–600 | 300–1,200 | | 100–400 |
| Average | 150 | 150 | 600 | | 150 |

¹ Moderate.  ² Good.  ³ Patchy but acceptable.

EXAMPLE 11

By way of comparison Example 1 was repeated but using 100 parts of an isotactic polypropylene of melt flow index 0.6 (measured at 230° C. using a 2.16 kg. load) in place of the mixture of polyethylene and polypropylene. In this example the amount of pentane was 20% and the amount of nitrogen was 0.4%. The extrusion temperature was 180° C. Also the decompression zone into which the blowing agents were injected was maintained at a temperature of 240° C., i.e. above the critical temperature of pentane (197° C.). However the mixture was then progressively cooled as it passed along the extruder to a die temperature of 180° C. A coarse foamed film was obtained having a broken cell structure giving a rough surface.

EXAMPLE 12

Example 11 was repeated but using a mixture of 90 parts of the polypropylene and 10 parts of a linear 4-methyl pentene-1 polymer in place of the 100 parts of polypropylene. The resultant paper-like film had a smoother surface than the product of Example 11 and a more uniform, finer cellular structure. Similar results were obtained using a mixture of 95 parts of the polypropylene and 5 parts of the 4-methyl pentene-1 polymer.

EXAMPLE 13

By way of comparison, to show that the benefits of the present invention only occur when using the specified type of blowing agent system, Example 1 was repeated but injecting only pentane, i.e. omitting the nitrogen injection. A non cellular translucent film was obtained having large bubles dispersed in a matrix of unfoamed polymer.

EXAMPLE 14

Again by way of comparison, an attempt was made to nucleate the formation of bubbles in the system of Example 13 by repeating Example 13 using a mixture of 93 parts of the polyethylene, 5 parts of the polypropylene and 2 parts of talc. A rough translucent film was obtained having a large cell size, larger than that of Example 3 wherein nitrogen was used but the polypropylene was omitted.

EXAMPLE 15

Again by way of comparison, an attempt was made to nucleate the formation of bubbles in the system of Example 13 by the use of a solid blowing agent incorporated into the polymer feed. Example 13 was repeated using a mixture of 94 parts of the polyethylene, 5 parts of the polypropylene and 1 part of azodicarbonamide. A film having a non-uniform cell structure having a fibrous appearance was obtained. The structure was coarser and more non-uniform than that of Example 3. Similar results were obtained using p,p'-oxybis(benzenesulphonylhydrazide) in place of azodicarbonamide, and also when using 2 parts of these solid blowing agents and, correspondingly 93 parts of the polyethylene and 5 parts of the polypropylene.

We claim:

1. A process for the manufacture of an open celled foamed thermoplastic material wherein a molten thermoplastic composition at an elevated pressure and temperature is discharged to a region of lower pressure, said thermoplastic composition comprising a homogeneous mixture of a polymeric component and a blowing agent system comprising a first blowing agent which at said elevated temperature and said elevated pressure is a liquid which is completely miscible with the molten polymeric component and which is gaseous at said elevated temperature at the pressure prevailing in said region of lower pressure, and a second blowing agent, which has a solubility of from 0.01% to 10% by weight in the mixture of the polymeric component and first blowing agent and a critical temperature below said elevated temperature, whereby an open celled foam is produced, characterized in that the polymeric component of said thermoplastic composition consists of a mixture of polymers containing as a major component thereof a crystalline stereoregular poly α-olefin and, as a minor component, a thermoplastic polymer of higher melting point than said crystalline polyolefin, said thermoplastic polymer of higher melting point constituting from 1 to 15% by weight of said mixture.

2. A process as claimed in claim 1 wherein the thermoplastic polymer of higher melting point is a crystalline stereoregular poly α-olefin.

3. A process as claimed in claim 1 wherein the higher melting polymer is present in an amount of from 3 to 12% by weight of the mixture of polymers.

4. A process as claimed in claim 3 wherein the higher melting polymer is present in an amount of from 5 to 10% by weight of the mixture of polymers.

5. A process as claimed in claim 1 wherein the major component of the mixture of polymers is a polymer of ethylene.

6. A process as claimed in claim 5 wherein the ethylene polymer has a specific gravity of 0.94 to 0.97.

7. A process as claimed in claim 5 wherein the mixture of polymers is a bicomponent mixture containing, as the polymer of higher melting point, a polymer of a monomer selected from the group consisting of propylene, butene-1 and 4-methyl pentene-1.

8. A process as claimed in claim 1 wherein the major component of the mixture of polymers is a crystalline propylene polymer.

9. A process as calimed in claim 8 wherein the mixture of polymers is a bicomponent mixture containing a polymer of 4-methyl pentene-1 as the polymer of higher melting point.

10. A process as claimed in claim 1 wherein the polymeric component is mixed with the blowing agent system in a screw extruder from which the thermoplastic composition is extruded into a region of lower pressure to permit foaming.

11. A process as claimed 10 wherein the two blowing agents are injected into a zone in extruder at lower pressure than that appertaining at a point upstream of said zone.

12. A process as claimed in claim 1 wherein the amount of the first blowing agent used is from 10 to 50% by weight, based on the weight of the polymeric component.

13. A process as claimed in claim 1 wherein the first blowing agent is a liquid having a boiling point, at atmospheric pressure, of above 20° C. and at least 10° C. below the elevated temperature at which the thermoplastic composition is discharged from the region of elevated temperature and pressure.

14. A process as claimed in claim 13 wherein the first blowing agent is pentane, 1,1,3-trichloro-1,2,2-trifluoroethane, hexane, petroleum ether or methylene chloride.

15. A process as claimed in claim 1 wherein the second blowing agent is carbon dioxide or nitrogen.

References Cited

UNITED STATES PATENTS

| | | | |
|---|---|---|---|
| 3,452,123 | 6/1969 | Beckmann et al. | 260—2.5 E |
| 3,491,173 | 1/1970 | Kobsa | 260—2.5 HA |
| 3,496,124 | 2/1970 | Needham et al. | 260—2.5 HA |
| 3,265,771 | 8/1966 | Ray et al. | 260—897 A |
| 3,281,501 | 10/1966 | Coats et al. | 260—897 A |
| 3,358,053 | 12/1967 | Hostetler | 260—897 A |
| 3,179,720 | 4/1965 | Hillmer | 260—897 A |
| 3,150,214 | 9/1964 | Scalora et al. | 260—2.5 E |
| 3,065,190 | 11/1962 | Chisholm et al. | 260—2.5 E |
| 3,254,139 | 5/1966 | Anderson et al. | 260—897 A |
| 3,356,765 | 12/1967 | Musso et al. | 260—897 A |
| 3,458,604 | 7/1969 | Palmer | 260—897 A |
| 3,586,645 | 6/1971 | Granger et al. | 260—2.5 E |

WILBERT J. BRIGGS, Sr, Primary Examiner

U.S. Cl. X.R.

204—159.2; 260—2.5 HA, 2.5 N, 33.2 R, 33.6 PQ, 33.8 UA, 41 A, 41 B, 857 L, 873, 897 A

UNITED STATES PATENT OFFICE
CERTIFICATE OF CORRECTION

Patent No. 3,793,239                              Dated February 19, 1974

Inventor(s) John Albert RIXON et al

It is certified that error appears in the above-identified patent and that said Letters Patent are hereby corrected as shown below:

IN THE SPECIFICATION:

Column 4, lines 40 and 44, "1,1,3-trichloro" should read "1,1,2-trichloro".

IN THE CLAIMS:

Column 10, line 48, claim 14, "1,1,3-trichloro" should read "1,1,2-trichloro".

Signed and sealed this 6th day of August 1974.

(SEAL)
Attest:

McCOY M. GIBSON, JR.                    C. MARSHALL DANN
Attesting Officer                       Commissioner of Patents